(12) United States Patent
Batalla et al.

(10) Patent No.: US 11,046,414 B2
(45) Date of Patent: Jun. 29, 2021

(54) WING-WINGBOX JUNCTION RIB FOR AN AIRCRAFT AND METHOD FOR PRODUCING AN AIRCRAFT USING SUCH A RIB

(71) Applicant: Airbus Operations SAS, Toulouse (FR)

(72) Inventors: Franck Batalla, Leguevin (FR); Denis Soula, Toulouse (FR); Javier Maqueda Lahoz, Colomiers (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 308 days.

(21) Appl. No.: 16/202,762

(22) Filed: Nov. 28, 2018

(65) Prior Publication Data

US 2019/0161156 A1    May 30, 2019

(30) Foreign Application Priority Data

Nov. 29, 2017    (FR) ...................................... 1761378

(51) Int. Cl.
*B64C 1/26*       (2006.01)
*B64C 3/18*       (2006.01)
*B64C 1/06*       (2006.01)

(52) U.S. Cl.
CPC ................ *B64C 1/26* (2013.01); *B64C 3/187* (2013.01); *B64C 1/06* (2013.01)

(58) Field of Classification Search
CPC .. B64C 1/26; B64C 3/187; B64C 1/06; B64C 1/061; B64C 1/068; E04C 2003/0452; E04C 2003/0473
See application file for complete search history.

(56) References Cited

U.S. PATENT DOCUMENTS 2,272,162 A  *  2/1942  Lackey ................... E04F 13/04
                                                        52/344
7,195,418 B2 *  3/2007  Durand .................... B64C 1/26
                                                        403/217
(Continued)

FOREIGN PATENT DOCUMENTS

EP         3138770 A1    3/2017
FR         2916417 A1   11/2008
(Continued)

OTHER PUBLICATIONS

French Search Report; priority document.
Michael Chun-Yung Niu, Airframe Structural Design (1988).

*Primary Examiner* — Richard R. Green
*Assistant Examiner* — Madison Elizabeth Dittner
(74) *Attorney, Agent, or Firm* — Greer, Burns & Crain, Ltd.

(57) ABSTRACT

In order to be able to reduce the time and cost required for final assembly of an aircraft, a junction rib designed for the wing-central wingbox junction comprises a central web and an upper flange and a lower flange which extend from the main web, on a first side, the main web having a junction surface arranged on a second side opposite the first side, the main web including rows of orifices opening on the second side in the junction surface and on the first side, comprising a first row of orifices and a third row of orifices formed in an upper part of the main web on either side of the upper flange, and a second row of orifices formed in a lower portion of the main web, each one of the rows of orifices comprising orifices in a free state.

19 Claims, 11 Drawing Sheets

(56) References Cited

U.S. PATENT DOCUMENTS

| | | | |
|---|---|---|---|
| 7,546,979 B1 | 6/2009 | Estell et al. | |
| 8,720,823 B2 | 5/2014 | Lafly et al. | |
| 9,004,406 B2 * | 4/2015 | Soenarjo | C08K 5/34924 |
| | | | 244/131 |
| 9,096,324 B2 * | 8/2015 | Erickson | B64D 37/005 |
| 9,102,106 B2 * | 8/2015 | Dazet | B29C 70/845 |
| 9,475,570 B2 * | 10/2016 | Charles | B64C 3/187 |
| 9,580,164 B2 * | 2/2017 | Zeon | B64C 1/26 |
| 9,688,382 B2 * | 6/2017 | Delahaye | B64F 5/10 |
| 2005/0224655 A1 * | 10/2005 | Guittard | B64C 1/26 |
| | | | 244/133 |
| 2009/0136294 A1 | 5/2009 | Porter et al. | |
| 2011/0089292 A1 | 4/2011 | Williams et al. | |
| 2011/0303357 A1 * | 12/2011 | Plaza | B64C 3/26 |
| | | | 156/281 |
| 2017/0066520 A1 | 3/2017 | Soula et al. | |

FOREIGN PATENT DOCUMENTS

| | | |
|---|---|---|
| WO | 2008105805 A2 | 9/2008 |
| WO | 2011158015 A2 | 12/2011 |

\* cited by examiner

WING-WINGBOX JUNCTION RIB FOR AN AIRCRAFT AND METHOD FOR PRODUCING AN AIRCRAFT USING SUCH A RIB

CROSS-REFERENCES TO RELATED APPLICATIONS

This application claims the benefit of the French patent application No. 1761378 filed on Nov. 29, 2017, the entire disclosures of which are incorporated herein by way of reference.

TECHNICAL FIELD

The present invention relates to the field of the structure of aircraft, and concerns more particularly a junction rib designed for the wing-central wingbox junction of an aircraft, a method for producing such a junction rib, the use of this junction rib or this method as part of a method for producing a wing central module for aircraft, the use of this latter method as part of a method for producing a fuselage section for aircraft, and finally, the use of this latter method as part of a method for producing an aircraft.

BACKGROUND OF THE INVENTION

In an aircraft including a fuselage and a wing including two opposite symmetrical wings fastened to the fuselage, the fuselage generally includes a box-shaped structure called "central wingbox," on which are fastened respective structures of the wings, also formed as boxes and generally called "lateral wingboxes."

The central wingbox typically includes an upper panel, also called extrados panel, a lower panel, also called intrados panel, and a front member and a rear member, each of which links the lower panel to the upper panel. The central wingbox generally includes inner stiffener ribs linking together the lower and upper panels and the front and rear members.

The joining of each wing to the fuselage is provided by a junction rib acting as a structural interface between the corresponding lateral wingbox and the central wingbox.

The junction rib generally includes a core, and a set of cross-shaped or T-shaped profile elements at the periphery of the core and fastened to it by means of shear bolts, as shown, for example, on page 283 of the publication by Michael Chun-Yung Niu, Airframe Structural Design (1988).

Each of the profile elements includes a flange that is fastened to a corresponding panel or member of the central wingbox, together with one or more angle fittings, and another flange that is fastened to a corresponding panel or member of the lateral wingbox, together with one or more other angle fittings. The flanges and fittings are generally fastened to the panels and members by means of shear bolts.

The configuration of these elements (rib and profile elements) obliges the installation and fastening operations of most of these elements to take place during advanced phases of the aircraft assembly process, in particular in the final assembly phase during which the wings are fastened to the fuselage.

Now, the final assembly phase is a particularly costly phase in respect of the entire process of assembling an aircraft.

SUMMARY OF THE INVENTION

A particular aim of the invention is to provide a simple, affordable and effective solution to this problem.

To this end, the invention proposes a junction rib intended for the wing-central wingbox junction of an aircraft, comprising a central web, as well as an upper flange and a lower flange, which extend from the main web, on a first side relative to the main web.

The main web has a junction surface arranged on a second side opposite the first side, the main web including rows of orifices opening on the second side in the junction surface and on the first side, the rows of orifices comprising at least a first row of orifices formed in an upper portion of the main web and extending from a front side to a rear side of the junction rib, and a second row of orifices formed in a lower portion of the main web and extending from the front side to the rear side of the junction rib, each row of orifices comprising orifices in a free state.

"Upper portion" and "lower portion" mean that the upper portion generally extends above the lower portion.

"Orifices in a free state" means that the orifices are unoccupied, that is to say able subsequently to accommodate fastening components.

The junction rib made in this way enables a wing to be joined to a section of aircraft fuselage in a particularly simple and effective manner, making it possible, in particular, to minimize the number and the complexity of the operations remaining to be implemented at the final assembly stage of the aircraft, as will emerge more clearly in what follows.

Furthermore, the rows of orifices comprise a third row of orifices formed in the upper portion of the main web and extending from the front side to the rear side of the junction rib, such that the first and third rows of orifices are arranged respectively on either side of the upper flange. The third row of orifices also comprises orifices in a free state.

The main web is thus able directly to absorb tension forces of upper fittings, as will emerge more clearly in what follows.

The junction rib preferably includes an extension which is inclined relative to the junction surface and which extends on the second side from an upper end of the upper portion of the main web, so as to form an obtuse angle with the upper flange in cross section.

The junction rib preferably furthermore includes a front flange and a rear flange that extend from the main web, on the first side relative to the main web, and the rows of orifices furthermore comprise a fourth row of orifices formed in a front portion of the main web and extending from a lower side to an upper side of the junction rib, and a fifth row of orifices formed in a rear portion of the main web and extending from the lower side to the upper side of the junction rib.

The invention also relates to a method for producing a junction rib of the type described above, comprising at least steps of:

a) providing a core, and profile elements each comprising a respective base and a respective flange extending to protrude from the base; then b) fastening the respective bases of the profile elements to the core, such that the respective flanges of the profile elements extend on a first side relative to the core, corresponding to the first side, the respective bases of the profile elements and the core together forming the main web;

and in which, at the end of the process, the main web includes the rows of orifices comprising at least the first row of orifices, formed in the base of a first one of the profile elements, called upper profile, and the second row of orifices, formed in the base of a second one of the profile elements, called lower profile, the upper and lower profiles being arranged at two opposite ends of the core, called upper end and lower end, such that the base of the upper profile forms the upper portion of the main web and such that the flange of the upper profile forms the upper flange, and such that the base of the lower profile forms the lower portion of the main web and such that the flange of the lower profile forms the lower flange, the base of the upper profile extending on either side of the flange of the upper profile and comprising the third row of orifices, and each row of orifices comprising orifices in a free state.

Each of the profile elements other than the upper profile preferably has an angled configuration.

The process preferably furthermore comprises steps of:
c) providing first angle fittings, called inner frame supports, each comprising a respective base and shoulder;
d) after the step b), fastening the respective bases of the inner frame supports to the main web.

If applicable, the rows of orifices furthermore advantageously comprise the fourth row of orifices, formed in a third one of the profile elements, called front profile, and the fifth row of orifices, formed in a fourth one of the profile elements, called rear profile, the front and rear profiles being arranged at two opposite ends of the core, respectively called front end and rear end, each of which links the upper end to the lower end of the core, such that the base of the front profile forms the front portion of the main web and such that the flange of the front profile forms the front flange, and such that the base of the rear profile forms the rear portion of the main web and that the flange of the rear profile forms the rear flange.

The invention also relates to a method for producing a wing central module for aircraft, comprising steps of:
A) producing at least one junction rib of the type described above, potentially by means of a method of the type described above;
B) providing at least one second angle fitting, called upper outer fitting, comprising a base and a shoulder;
C) providing at least one strap;
D) providing a central wingbox, including at least an upper panel, a lower panel, a front member linking a front end of the upper panel to a front end of the lower panel, and a rear member linking a rear end of the upper panel to a rear end of the lower panel, such that the upper and lower panels and the front and rear members delimit an inner space of the central wingbox open at at least one lateral end of the central wingbox, then
E) disposing the junction rib at the lateral end of the central wingbox by inserting the flanges into the inner space of the central wingbox, such that the upper flange is facing the upper panel and the lower flange is facing the lower panel; then
F) fastening together the upper flange and the base of the at least one upper outer fitting to the upper panel using first through-mounted fastening components, and fastening together the lower flange and a proximal portion of the at least one strap to the lower panel using second through-mounted fastening components, such that a distal portion of the at least one strap extends beyond the junction surface in a distancing direction relative to the central wingbox.

If applicable, the step F) furthermore advantageously includes fastening the front and rear flanges respectively to the front and rear members.

The distal portion of the at least one strap preferably forms, in cross section, an angle relative to the proximal portion of the at least one strap.

If applicable, the shoulder of the at least one upper outer fitting advantageously includes orifices aligned respectively with the orifices of the third row of orifices.

The invention also relates to a method for producing a fuselage section for aircraft, at least comprising steps of:
i) producing a central wing module for aircraft according to a method of the type described above;
ii) providing a fuselage structure;
iii) fastening the at least one upper outer fitting to the fuselage structure.

In preferred embodiments:
the fuselage structure includes circumferential frames provided with respective third angle fittings, called outer frame supports, each comprising a respective base and a respective shoulder; and
step iii) includes fastening the respective shoulders of the outer frame supports respectively to the respective shoulders of the inner frame supports using third through-mounted fastening components.

In preferred embodiments, the fuselage structure includes a skin and step iii) includes fastening the skin to the extension using fourth through-mounted fastening components.

The invention also relates to a method for producing an aircraft, at least comprising steps of:
I) producing a fuselage section according to a method of the type described above;
II) providing at least one wing including a lateral wingbox delimiting an inner space; then
III) positioning one end of the lateral wingbox to face the junction surface, such that the distal portion of the at least one strap is positioned outside the inner space of the lateral wingbox; then
IV) fastening the lateral wingbox to the junction rib using fastening components working in tension/compression, engaged respectively in the orifices of the rows of orifices, and fastening the lateral wingbox to the distal portion of the at least one strap using fifth through-mounted fastening components.

Preferably:
the lateral wingbox includes an upper panel and a lower panel, as well as at least one fourth angle fitting and at least one fifth angle fitting;
the at least one fourth and fifth angle fittings each comprise a respective base and a shoulder;
the base of the at least one fourth angle fitting is fastened to the upper panel of the lateral wingbox, inside the inner space of the lateral wingbox;
the base of the at least one fifth angle fitting is fastened to the lower panel of the lateral wingbox, inside the inner space of the lateral wingbox;
the fastening components working in tension/compression comprise sixth through-mounted fastening components mounted through orifices formed in the shoulder of the at least one fourth angle fitting and orifices of the first row of orifices; and
the fastening components working in tension/compression comprise seventh through-mounted fastening components mounted through orifices formed in the shoulder of the at least one fifth angle fitting and orifices of the second row of orifices.

In preferred embodiments:
the lateral wingbox includes at least one sixth angle fitting comprising a base and a shoulder;
the base of the at least one sixth angle fitting is fastened to the upper panel outside the inner space of the lateral wingbox; and the fastening components working in tension/compression comprise eighth through-mounted fastening components mounted through orifices formed in the shoulder of the at least one sixth angle fitting, orifices of the third row of orifices and orifices of the shoulder of the at least one upper outer angle fitting.

BRIEF DESCRIPTION OF THE DRAWINGS

The invention will be better understood, and further details, advantages and characteristics thereof will emerge on reading the following description given by way of non-limitative example and with reference to the attached drawings, in which.

DETAILED DESCRIPTION OF THE PREFERRED EMBODIMENTS

A junction rib designed for the wing-central wingbox junction of an aircraft according to a preferred embodiment of the invention, and a method for producing an aircraft according to a preferred embodiment of the invention, making best use of advantages procured by the junction rib, will now be described with reference to FIGS. 1 to 19, which successively illustrate different steps of the process, and with permanent reference to FIG. 20, which shows a general flowchart of the process.

In the description that follows, the directions X, Y and Z are defined by reference to the orientation of the elements within the aircraft in terms of the producing process thereof. The longitudinal direction X is conventionally defined as being parallel to the roll axis of the aircraft, the transversal direction Y as being parallel to the pitch axis of the aircraft and the vertical direction Z as being parallel to the yaw axis of the aircraft.

The method for producing the aircraft first includes a step I) comprising producing a fuselage section.

The step I) in turn includes a step i) comprising producing a central wing module.

The step i) includes a step A), which comprises producing at least one junction rib, and which will now be described in detail.

As an example, the junction rib considered is designed to equip the right-hand side of the aircraft.

Figure 4:
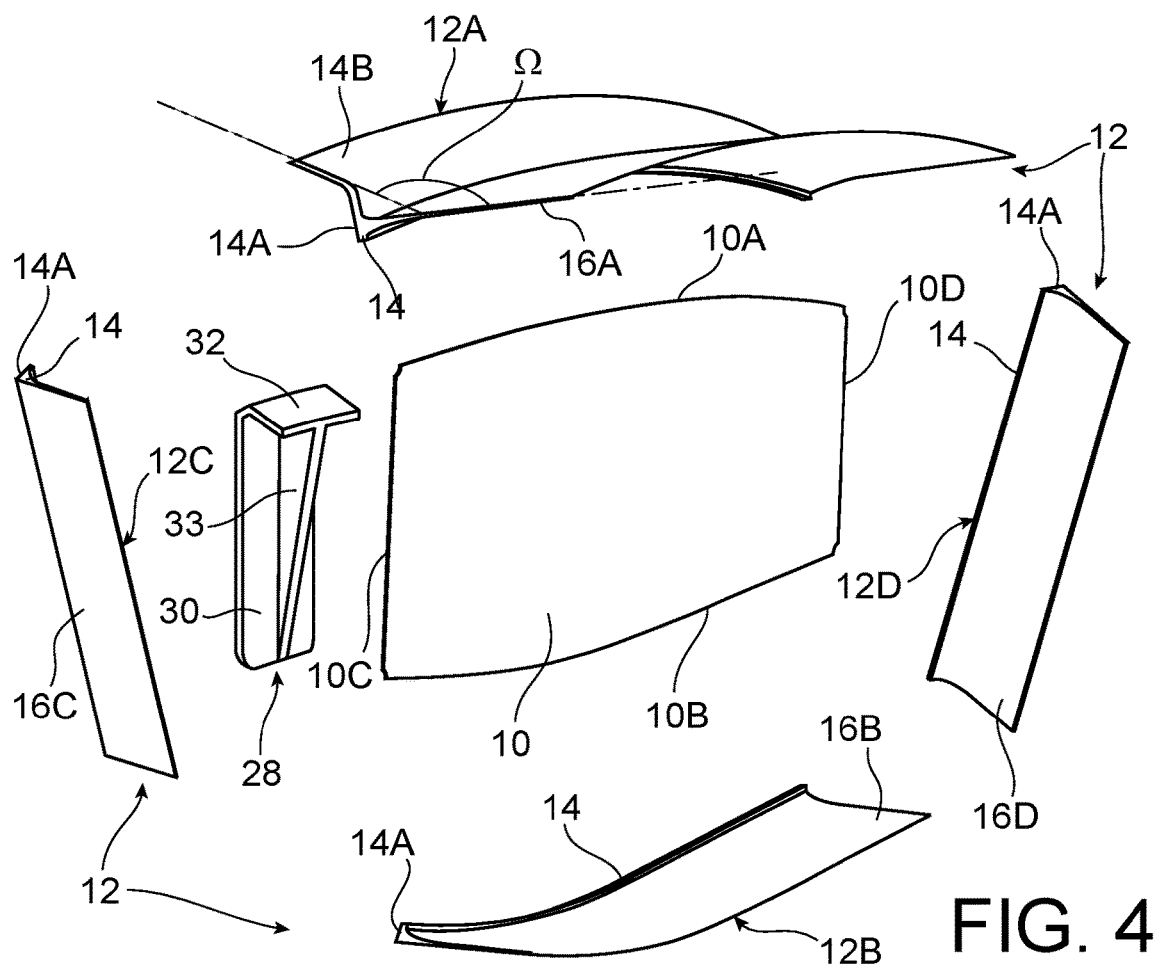
FIG. 4 is a schematic view in perspective of elements designed for producing the junction rib.

With reference to FIG. 4, the step A) includes a first step a) comprising providing a core 10 and profile elements 12, each comprising a respective base 14 having a main front face 14A, and a respective flange 16A-16D extending to protrude from the base 14, on a side opposite the main front face 14A.

Figure 1:
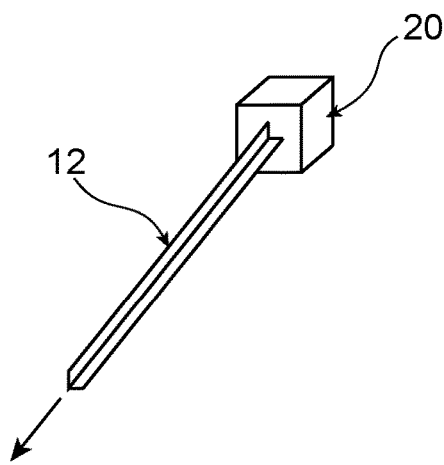
FIGS. 1 to 3 are schematic views in perspective of a profile element designed for producing a junction rib, during successive steps of production of the profile element.
Figure 2:
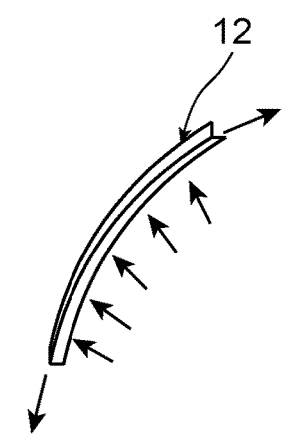
Figure 3:
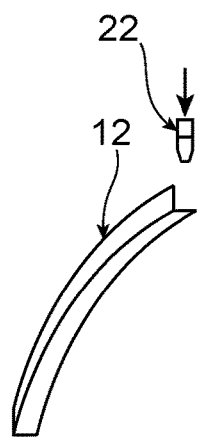

With reference to FIGS. 1 to 3, each of the profile elements 12 can advantageously be produced by a method including a step of extruding a material intended to form the element 12, through a die 20 (FIG. 1) configured to form the base 14 and the flange 16, then a potential step of forming the element 12 (FIG. 2) enabling a bend to be conferred on the element 12.

The conformation of the profile elements 12 is well suited to production by extrusion, which allows extrusions to be produced in one piece at a cost considerably lower than the forging technologies sometimes used to produce the cross-shaped or T-shaped profile elements of the prior art.

The method for producing the profile elements 12 beforehand can furthermore include a step of machining the element 12 using a machining tool 22 (FIG. 3) potentially making it possible to perfect the surface condition of the element 12, and if applicable, to form orifices through the base 14 and potential countersinks around each orifice (the orifices and countersinks not being visible on FIGS. 1-4). In the preferred embodiment of the invention, the step of making the aforementioned orifices is, however, implemented later, as will emerge more clearly in what follows.

As shown in FIG. 4, the profile elements comprise a first profile element, called an upper profile 12A, a second profile element, called a lower profile 12B, a third profile element, called a front profile 12C, and a fourth profile element, called a rear profile 12D.

The upper profile 12A and lower profile 12B are arranged at two opposite ends of the core 10, namely an upper end 10A and a lower end 10B. Similarly, the front profile 12C and rear profile 12D are arranged at two other opposite ends of the core 10, namely a front end 10C and a rear end 10D, each of which links the upper end 10A with the lower end 10B.

Each element, among the lower profile 12B, the front profile 12C and the rear profile 12D, integrally comprises its respective base 14 and its respective flange 16B-16D. Moreover, the base 14 of each of these profile elements extends from one end of the corresponding flange 16B-16D. These three profile elements thus each have a configuration called "angled." In the terminology of the present invention, the expression "angled" is intended to cover a configuration in which the flange 16B-16D is orthogonal, or inclined at an angle of more than 45 degrees, relative to the main front face 14A of the base 14.

In contrast, the base 14 of the upper profile 12A, and, in particular, the main front face 14A thereof extend on either side of the flange 16A of this upper profile, at one end of the flange.

Moreover, the base 14 of the upper profile 12A includes an extension 14B which is inclined relative to the junction surface 24 extending from an upper end of the corresponding main front face 14A, while being inclined relative thereto, such that the extension 14B and the upper flange 16A form an obtuse angle Ω and extend from two opposite sides relative to the corresponding main front face 14A.

Figure 5:
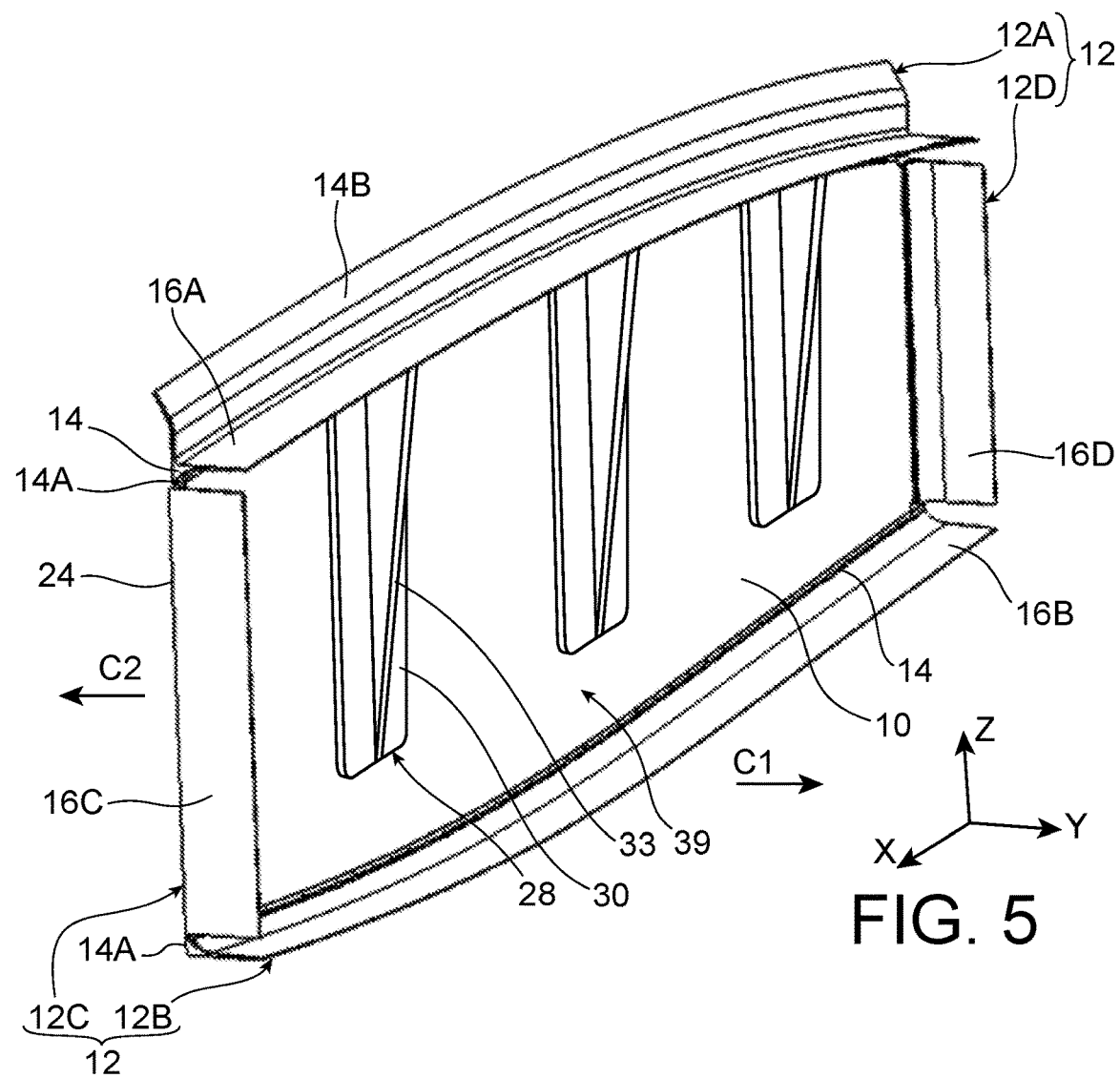
FIG. 5 is a schematic view in perspective of components of FIG. 4 assembled to form the junction rib.
Figure 9:
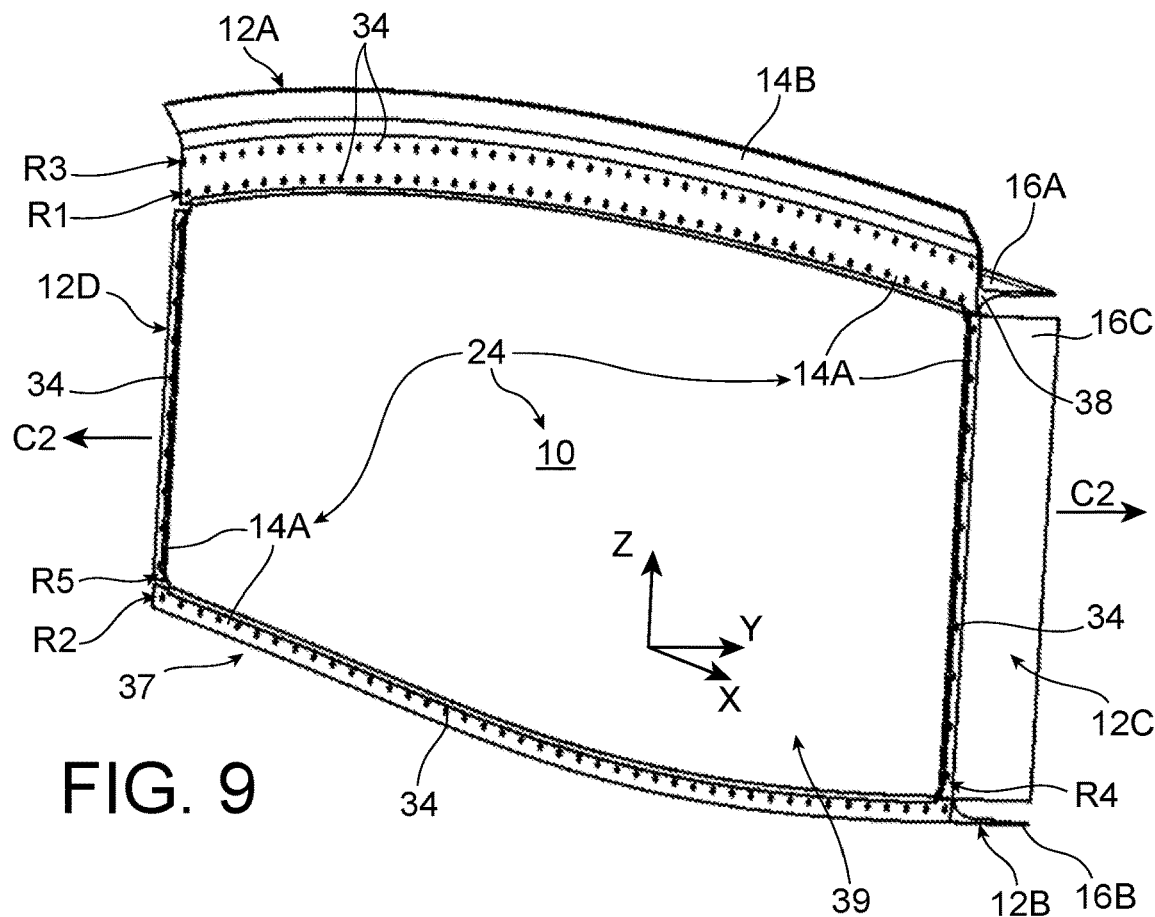
FIG. 9 is a view similar to FIG. 7, but from a different angle.

The step A) then includes a step b) comprising fastening the respective bases 14 of the profile elements 12 to the core 10, such that the respective flanges 16A-16D of the profile elements extend from a first side C1 relative to the core 10, as shown on FIG. 5, and such that the respective bases 14 of the profile elements 12 and the core 10 together form a main web 39, which has a junction surface 24, preferably continuous, arranged on a second side C2 opposite the first side C1, as will emerge more clearly in what follows (FIG. 9). The junction surface 24 thus includes the main front faces 14A of the bases 14. As shown in FIG. 5, the extension 14B of the base of the upper profile 12A therefore extends on the second side C2.

Figure 6:
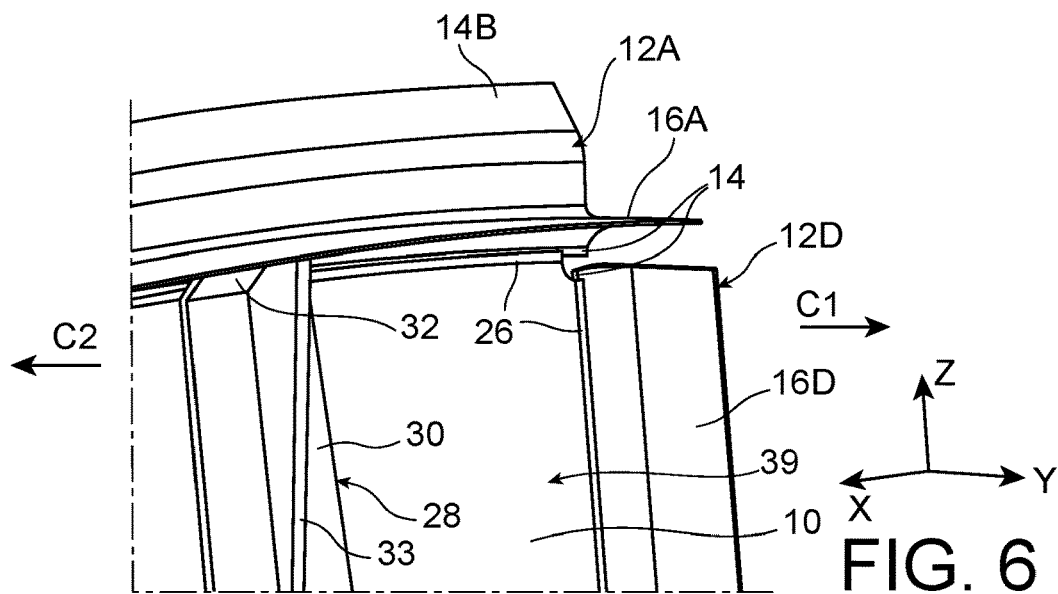
FIG. 6 is a magnified view of a part of FIG. 5.

In the preferred embodiment of the invention, the bases 14 are fastened edge to edge to the core 10 by friction stir welding (FSW). FIG. 6 thus allows the weld beads 26 to be seen at the interface between the bases 14 and the core 10.

The step A) furthermore comprises a step c) comprising providing first angle fittings 28, called inner frame supports, each comprising a respective base 30 and a shoulder 32 (one of these inner frame supports being visible on FIG. 4). Each of the inner frame supports 28 furthermore includes a stiffener web 33 in the shape of a ramp.

After the steps b) and c), the step A) includes a step d) comprising fastening the respective bases 30 of the inner frame supports 28 to the main web 39, typically on at least one element among the core 10 and the base 14 of the upper profile 12A, such that the respective shoulders 32 of the inner frame supports 28 are disposed facing, and preferably in contact with, the flange 16A of the upper profile 12A. In the illustrated example, the bases 30 are fastened to the core 10. FIGS. 5 and 6 show the assembly thus constituted on completion of the step d).

Figure 7:
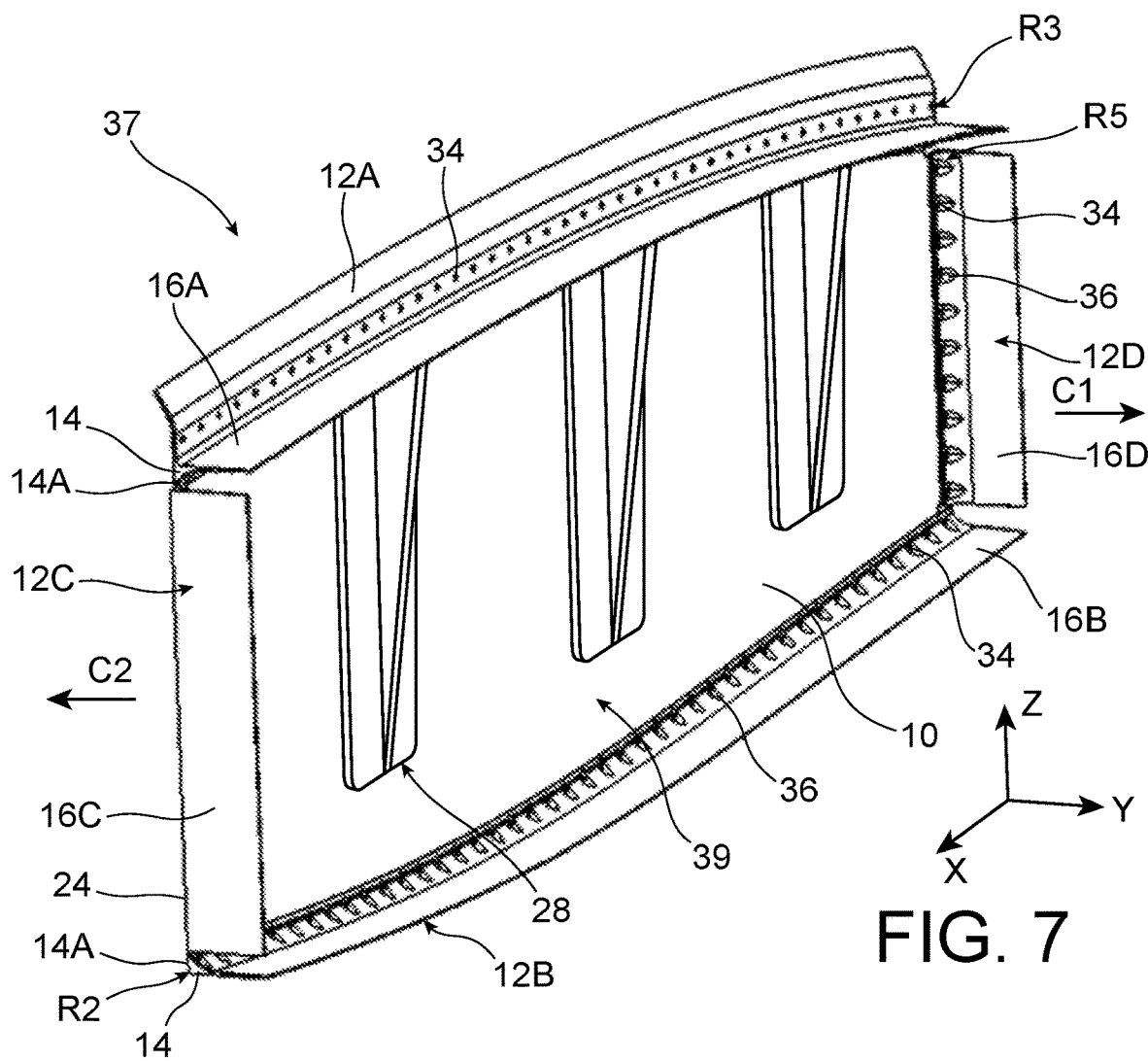
FIG. 7 is a view similar to FIG. 5, illustrating the junction rib at a subsequent stage of its production.
Figure 8:
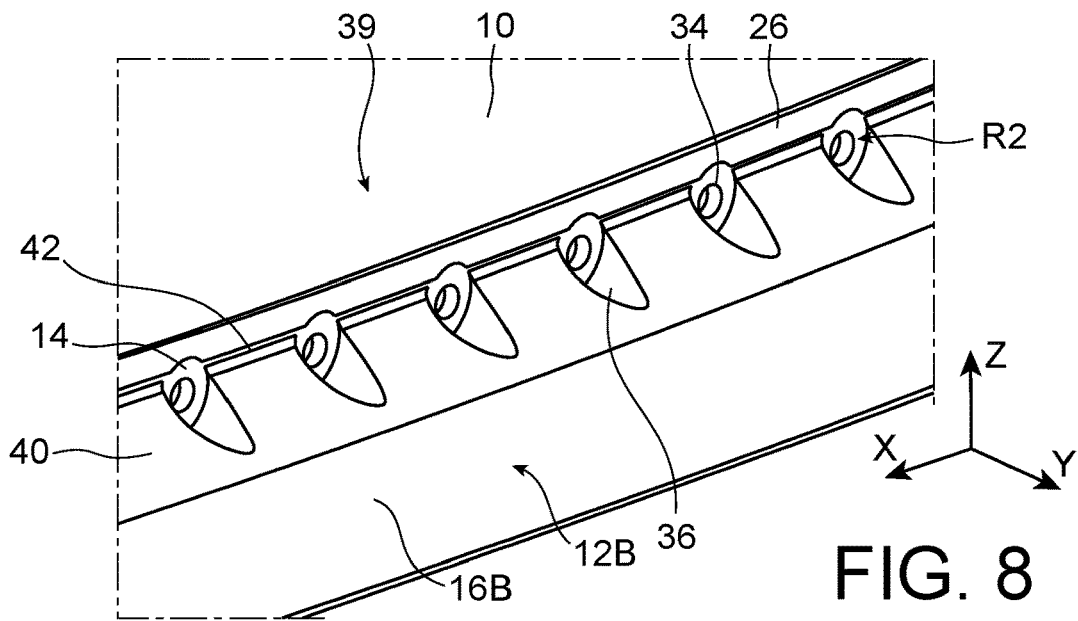
FIG. 8 is a magnified view of a part of FIG. 7.

In the case where the abovementioned orifices were not formed beforehand, the step A) then includes a step e) comprising drilling these orifices 34 through the bases 14 of each of the profile elements 12 (FIG. 7), and, preferably, of forming countersinks 36 around all or some of the orifices of the profile elements 12 (FIGS. 7 and 8).

The junction rib 37 obtained on completion of the step A) is visible on FIG. 9.

It should be noted that the step A) for producing the junction rib 37 can be different from the above description. The profile elements 12 can for example be fastened to the core 10 by other means, for example by through-mounted fastening components. In other embodiments, the profile elements 12 and the core 10 can be made in a single piece, for example by molding.

Independently of its production method, the junction rib 37 therefore includes the main web 39, from which the flanges 16A-16D extend on the first side C1, and which defines the junction surface 24 of the second side C2. This main web 39 corresponds, in the preferred embodiment of the invention described above, to the assembly formed by the core 10 and by the bases 14 of the profile elements 12.

In any case, the main web 39 includes, on completion of the step A), rows of orifices 34 opening on the second side C2 in the junction surface, and on the first side C1 (opposite the surface), these orifices 34 therefore being through orifices.

The rows of orifices 34 comprise at least a first row of orifices R1 formed in an upper portion of the main web 39, if applicable in the base 14 of the upper profile 12A, and a second row of orifices R2 formed in a lower portion of the main web 39, if applicable in the base 14 of the lower profile 12B, as shown on FIG. 9. The rows R1 and R2 extend globally from a front side to a rear side of the junction rib, respectively close to upper and lower ends of the main web 39.

Figure 10:
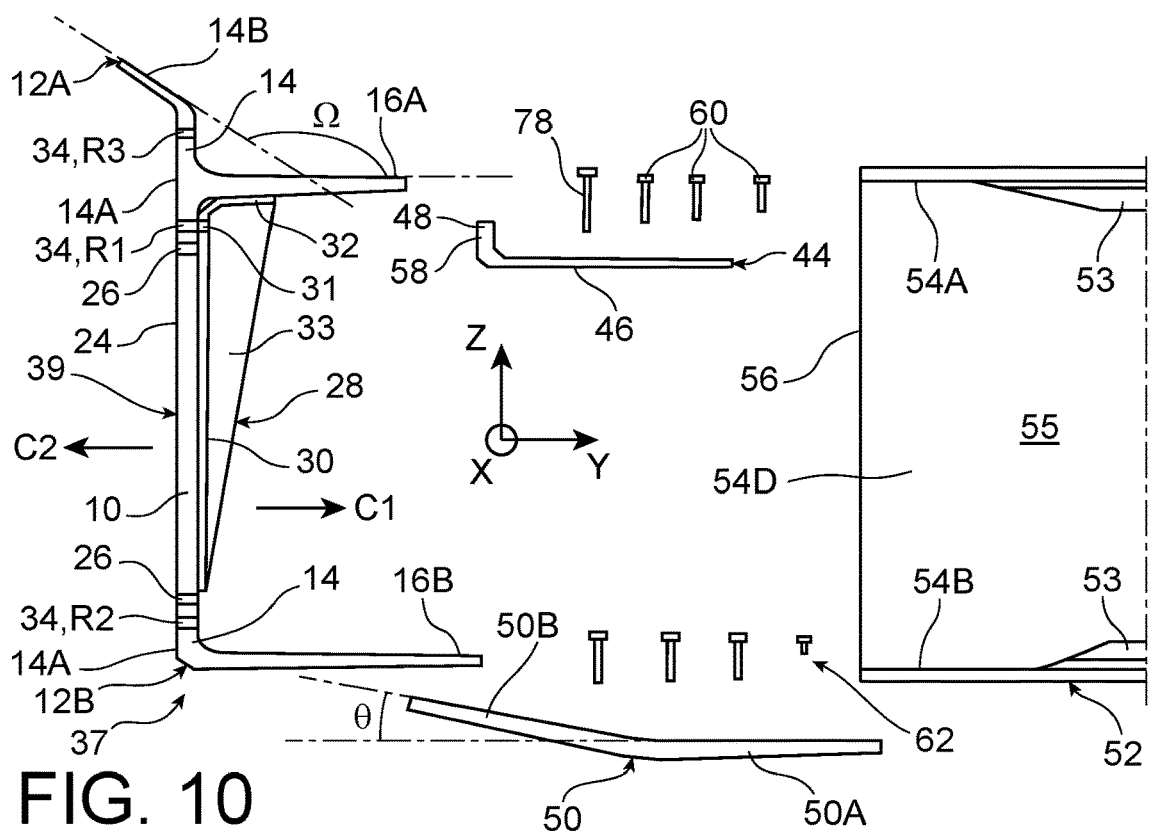
FIGS. 10 and 11 are schematic views, respectively in cross section and in perspective, of the junction rib and other elements designed for producing a central wing module.

If applicable, some of the orifices of the first row R1 are aligned with orifices formed in the respective bases 30 of the inner frame supports 28, as will emerge more clearly in what follows (FIG. 10).

In the preferred embodiment of the invention, the rows of orifices 34 furthermore comprise a third row of orifices R3 extending globally from the front side to the rear side of the junction rib and formed in the upper portion of the main web 39, if applicable in the base 14 of the upper profile 12A (FIG. 9), such that the first row of orifices R1 and the third row of orifices R3 are arranged (and emerge) respectively on either side of the upper flange 16A. The first row R1 is thus situated between the core 10 and the third row R3 or, in a more general way, between the second row R2 and the third row R3.

The rows of orifices 34 also comprise a fourth row of orifices R4 made in a front portion of the main web 39, if applicable in the base 14 of the front profile 12C, and a fifth row of orifices R5 formed in a rear portion of the main web 39, if applicable in the base 14 of the rear profile 12D. The rows R4 and R5 extend globally from a lower side to an upper side of the junction rib, respectively close to front and rear ends of the main web 39.

The rows R1, R2, R4 and R5 are each arranged in a corresponding portion of the base 14 through which the corresponding profile element 12 is fastened to the core 10. In the case of the lower profile 12B, the front profile 12C and the rear profile 12D, the abovementioned portion corresponds to the whole of the base 14. In the case of the upper profile 12A, the abovementioned portion is the portion 38 of the base 14 situated towards the core 10 relative to the upper flange 16A.

If applicable, the extension 14B extends on the second side C2 from an upper end of the upper portion of the main web 39.

In the preferred embodiment of the invention, the flanges 16A-16D are connected to the bases 14 by respective fillets 40 (FIG. 8) through which countersinks 36 are formed. Each of the fillets 40 has a discontinuity of curve 42 at its connection to the corresponding base 14. Such a discontinuity of curve makes it possible to increase the curve radius of the fillet 40 without increasing the extent of the base 14 in the direction orthogonal to the corresponding flange 16A-16D. The fillets 40 thus have a relatively significant thickness, which allows them to have a stiffening role within the profile elements 12.

In the preferred embodiment of the invention, the rows R1, R2, R4 and R5 are provided with countersinks 36, whereas they are lacking from the row R3.

In any case, it should be noted that the majority—or preferably the totality—of the orifices 34 are in a free state, on completion of the step A) of the method. This means that in the case where some of the orifices 34 are aligned with orifices formed in the respective bases 30 of the inner frame supports 28, the orifices 34 can be penetrated by components for temporary fastening ensuring fastening of the bases 30 to the main web 39. The other orifices 34 are nevertheless in a free state, that is to say unoccupied and therefore able subsequently to accommodate fastening components. In the case where none of the orifices 34 is used for fastening the bases 30 to the main web 39, the totality of the orifices 34 are in a free state. In any case, it is clear that the orifices 34 in a free state do not contribute to fastening the profile elements 12 to the core 10, or more generally to the mutual assembly of elements constituting the junction rib 37.

Figure 11:
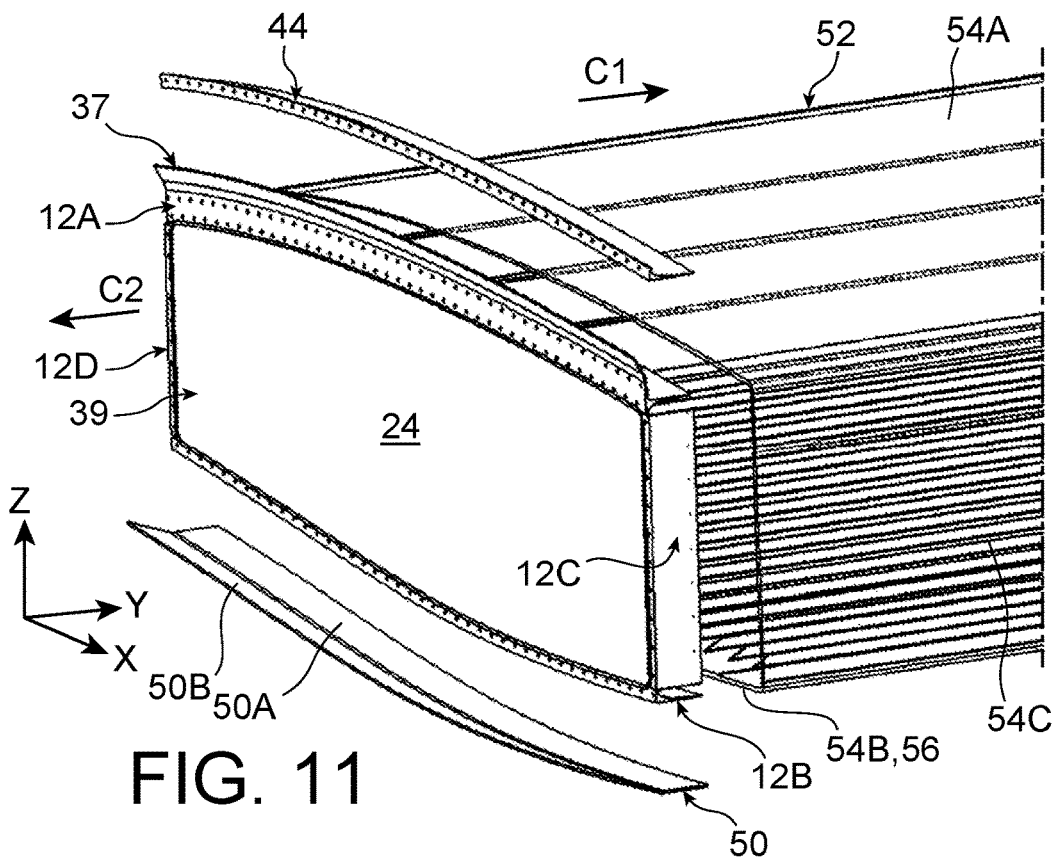
Figure 20:
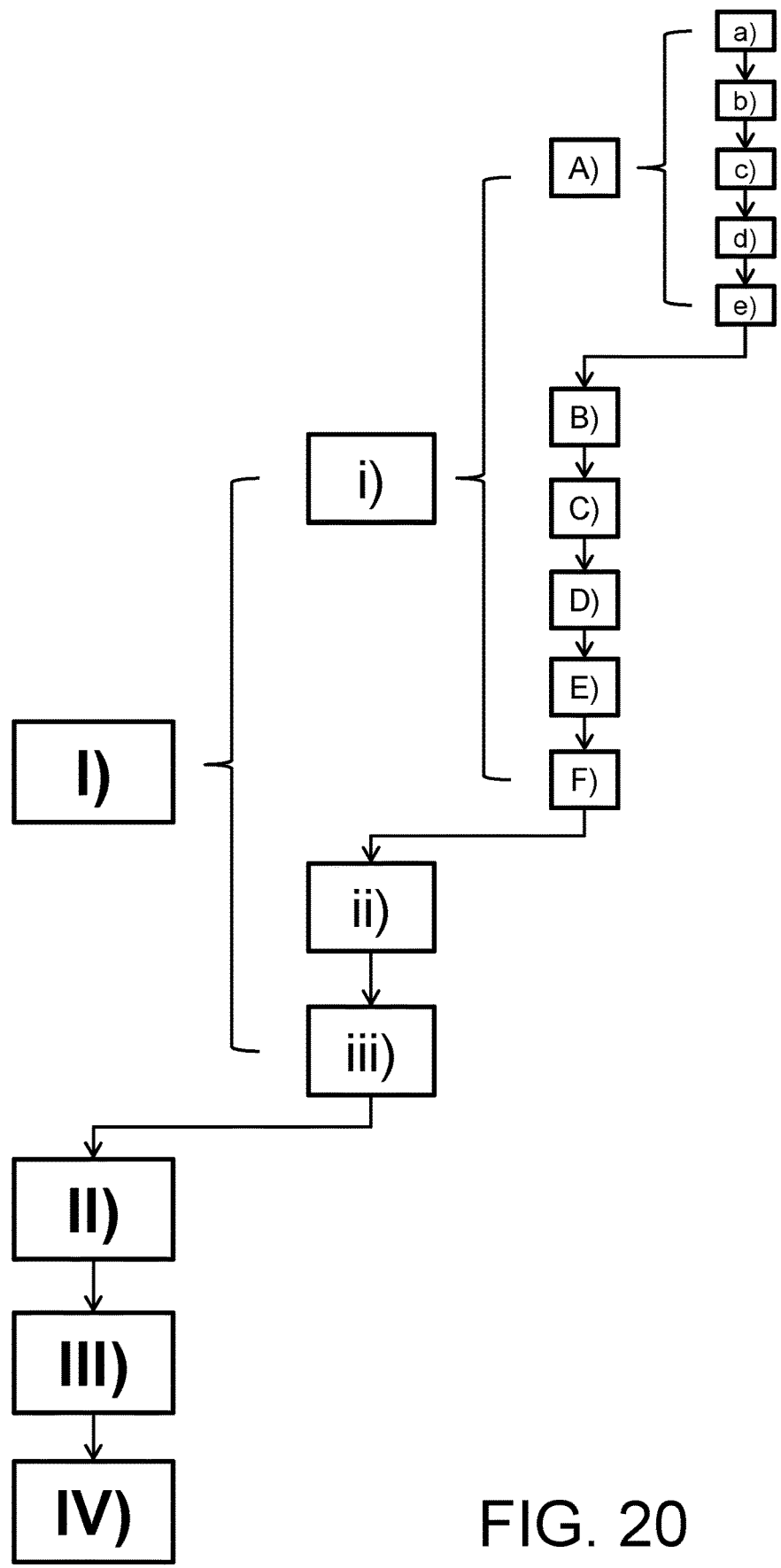
FIG. 20 is a flowchart of a method for producing an aircraft according to a preferred embodiment of the invention.

With reference to FIGS. 10, 11 and 20, the step i) then includes:

a step B) comprising providing a second angle fitting 44, called upper outer fitting, comprising a respective a base 46 and a shoulder 48, a step C) comprising providing a strap 50, and a step D) comprising providing a central wingbox 52, including at least an upper panel 54A, a lower panel 54B, a front member 54C linking a front end of the upper panel to a front end of the lower panel, and a rear member 54D linking a rear end of the upper panel to a rear end of the lower panel.

The upper panel 54A and the lower panel 54B and the front member 54C and the rear member 54D thus delimit an inner space 55 of the central wingbox, open at the lateral ends 56 of the central wingbox 52 (only one of the lateral ends 56 being visible on FIGS. 9-18).

The upper panel 54A and the lower panel 54B are provided, on their respective inner front faces, with stiffeners 53, in a well-known manner The shoulder 48 of the upper outer fitting 44 includes orifices 58 (FIGS. 10-11), arranged to be able to be aligned respectively with all or some of the orifices 34 of the third row R3.

The strap 50 preferably includes a proximal portion 50A and a distal portion 50B inclined relative to each other, such that in cross section, the upper front face of the distal portion 50B forms an angle θ relative to the upper front face of the proximal portion 50A, this latter upper front face extending typically parallel to the directions X and Y. Of course, the angle θ is between 90 degrees and 180 degrees exclusive, and is preferably more than 135 degrees.

In the preferred embodiment of the invention, the upper outer fitting 44 and the strap 50 are elements each made in a single piece, preferably by extrusion, like the profile elements 12.

With reference to FIGS. 12 to 14 and 20, the step i) then includes:

a step E) comprising disposing the junction rib 37 at a lateral end 56 of the central wingbox (visible on FIG. 11), by inserting the flanges 16A-16D in the inner space of the central wingbox 52, such that the upper flange 16A is facing, and is substantially in contact with, the upper panel 54A and that the lower flange 16B is facing, and is substantially in contact with, the lower panel 54B, then a step F) comprising, in particular, fastening together the upper flange 16A and the base 46 of the upper outer fitting 44 to the upper panel 54A using first through-mounted fastening components 60 (visible on FIG. 10), and fastening together the lower flange 16B and the proximal portion 50A of the strap 50 to the lower panel 54B using second through-mounted fastening components 62 (FIG. 10), such that the distal portion 50B of the strap 50 extends beyond the junction surface 24, in a distancing direction relative to the central wingbox 52, which corresponds to the direction going from the first side C1 to the second side C2.

Figure 15:
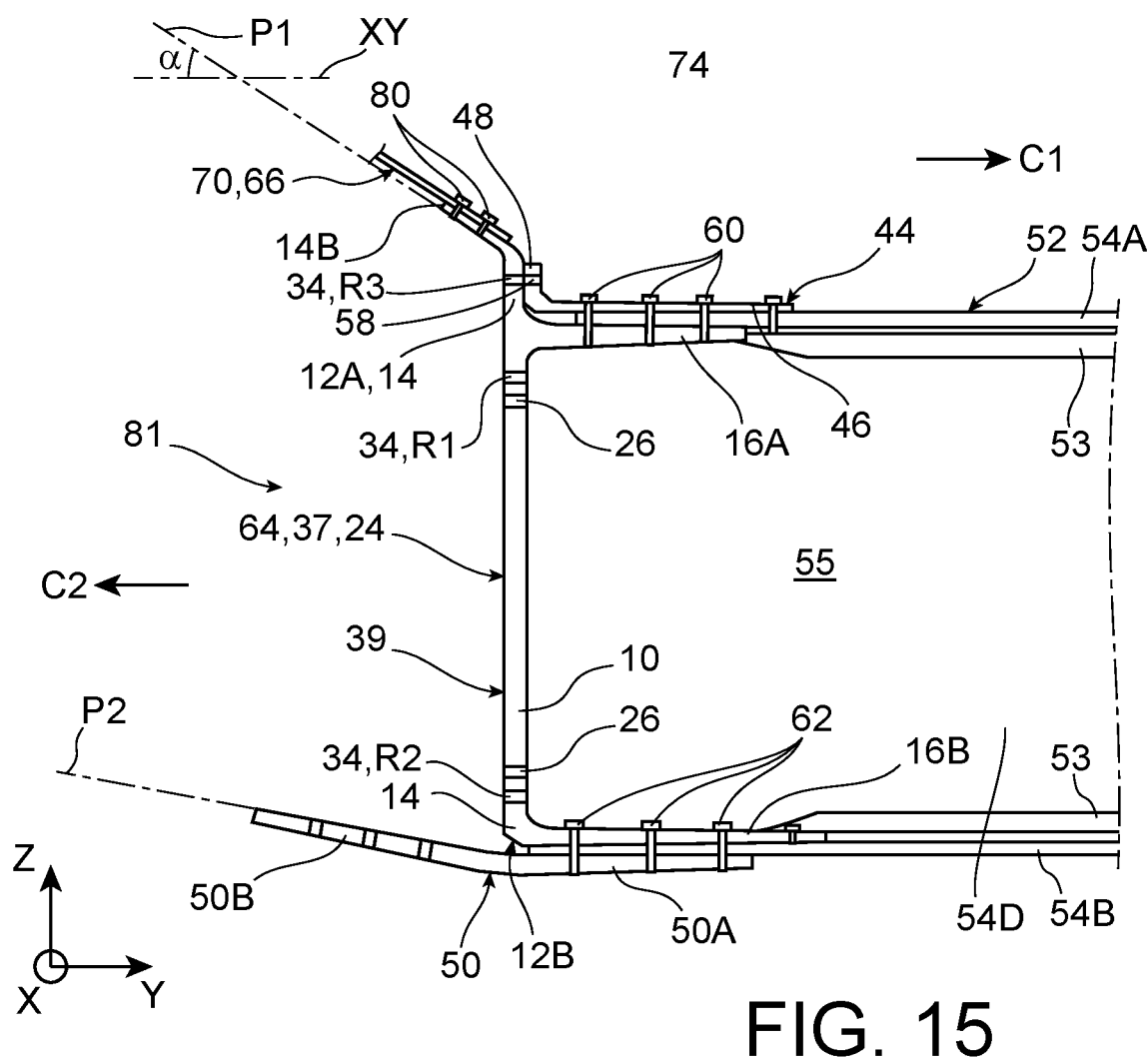
FIGS. 15 and 16 are partial schematic views in cross section of a fuselage section for aircraft including the central wing module of FIG. 12.

The upper outer fitting 44 is positioned such that the orifices 58 of its shoulder 48 are aligned with the orifices of the third row of orifices R3 of the upper profile 12A (as shown on FIG. 15).

The step F) also comprises fastening the respective flanges 16C, 16D of the front profile 12C and the rear profile 12D to the front member 54C and the rear member 54D respectively.

Figure 12:
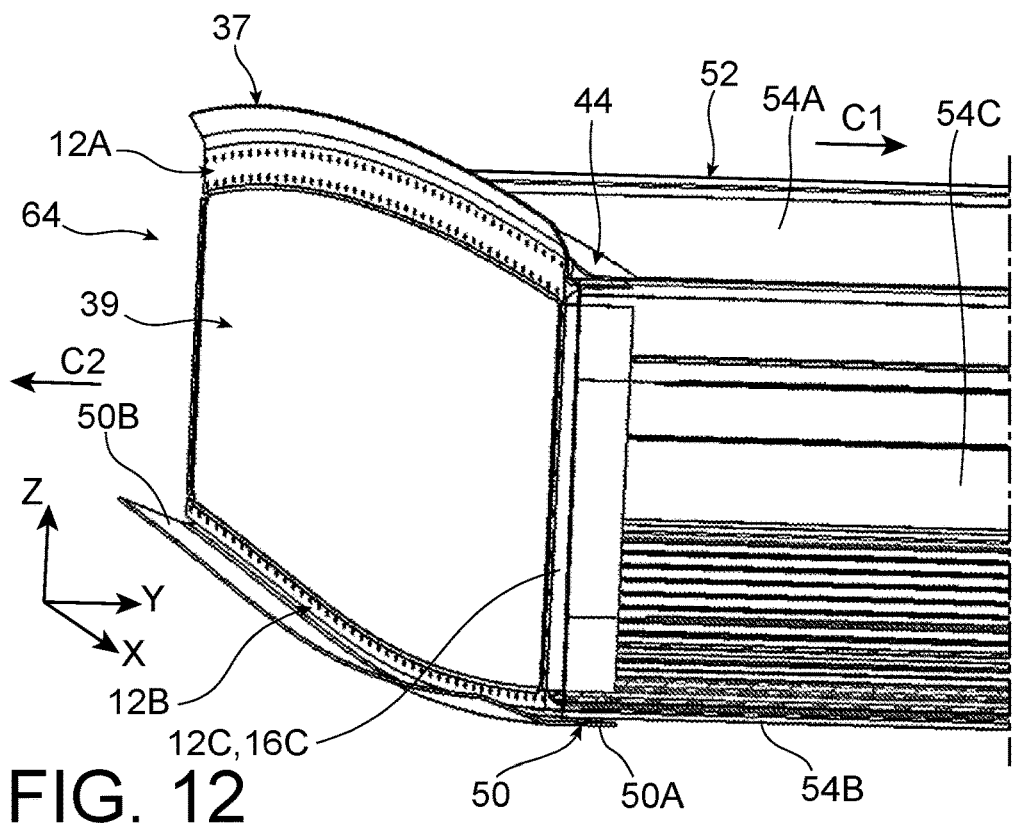
FIG. 12 is a partial schematic view in perspective of the central wing module formed by assembling the elements of FIGS. 10 and 11.
Figure 13:
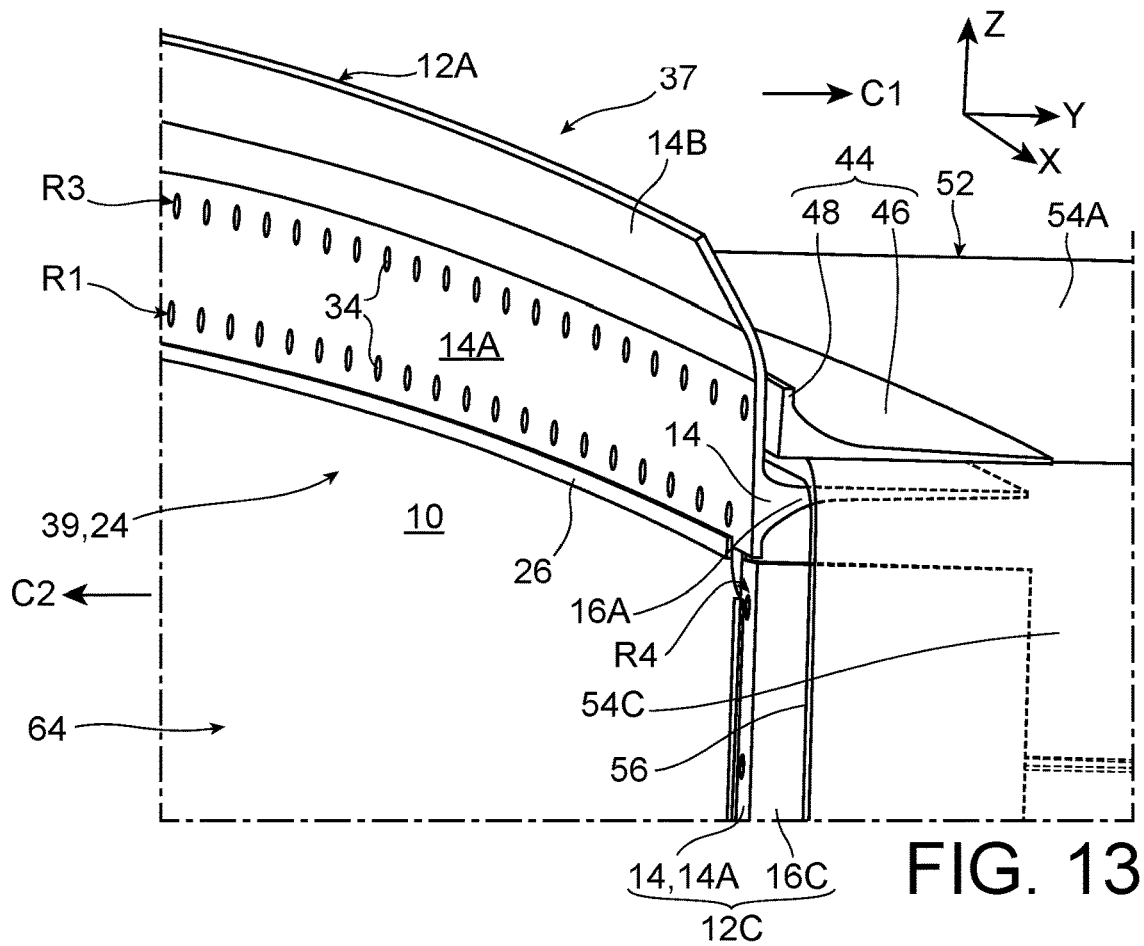
FIGS. 13 and 14 are magnified views of parts of FIG. 12.
Figure 14:
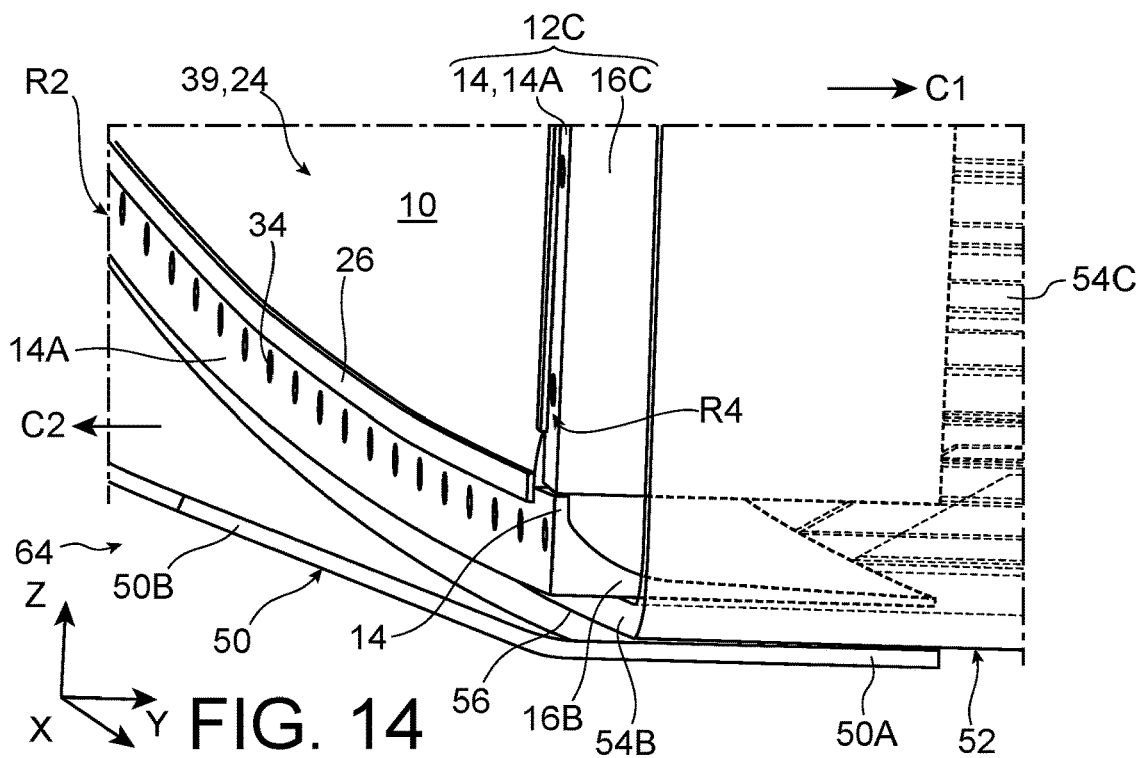

FIGS. 12 to 14 illustrate the central wing module 64, obtained on completion of the step i) and made from the central wingbox 52 and the junction rib 37 assembled together in the manner described above. For reasons of clarity, the fastening components 60 and 62 are not visible on these figures.

Figure 16:
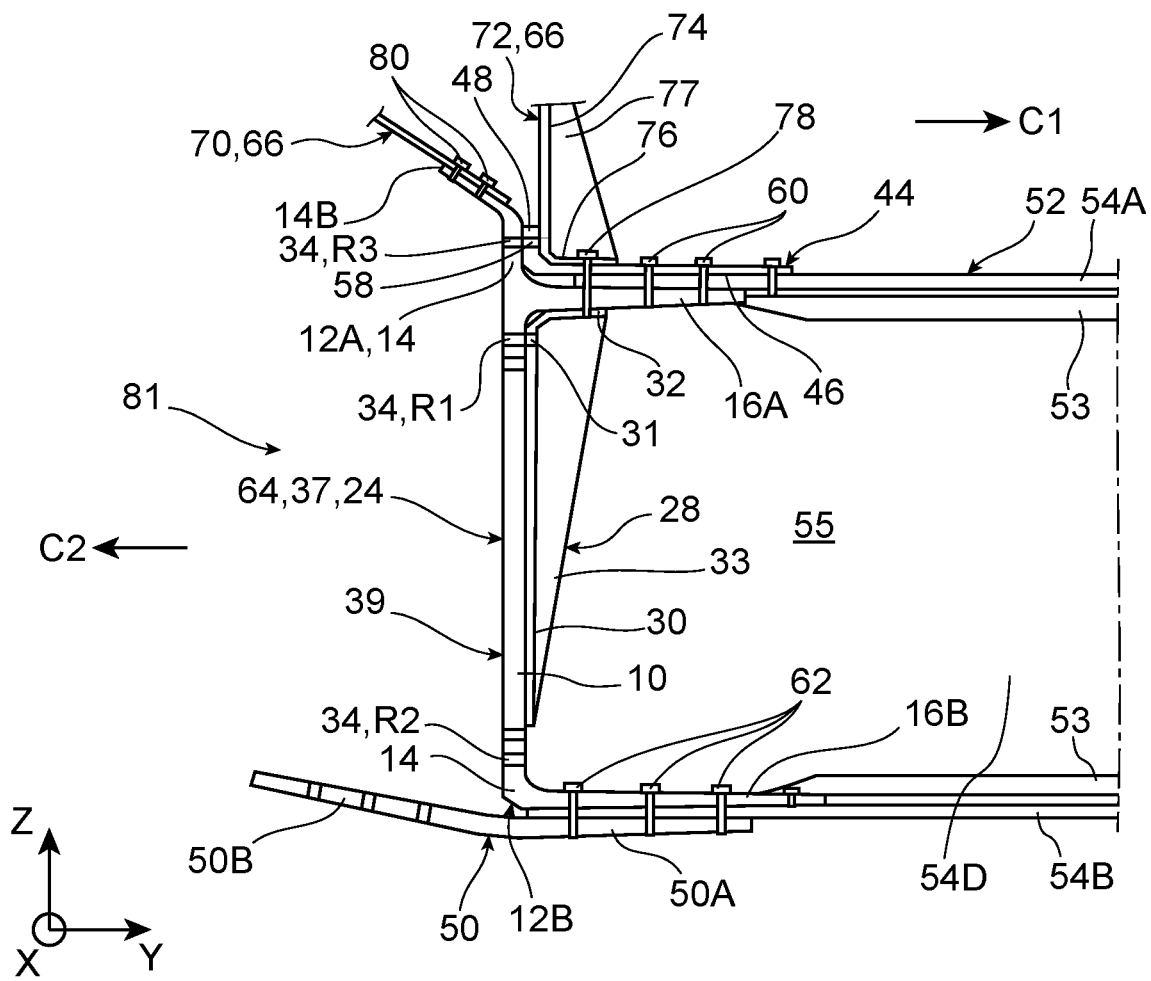

With reference to FIGS. 15, 16 and 20, the step I) then includes a step ii) comprising, in a general way, providing a fuselage structure 66 (partially visible on FIGS. 15, 16 and 19), and a step iii) comprising, in a general way, fastening the upper outer fitting 44 to the fuselage structure 66.

More precisely, the fuselage structure 66 typically includes circumferential frames and a skin 70 fastened to the circumferential frames 68. The circumferential frames 68 include (in a single piece or by assembly) third respective angle fittings 72, called outer frame supports, each comprising a respective base 74 and a shoulder 76, as well as a respective stiffener web 77.

In this case, the step iii) includes fastening the respective shoulders 76 of the outer frame supports 72 respectively to the respective shoulders 32 of the inner frame supports 28 using third through-mounted fastening components 78 (FIG. 16). These components 78 pass through the shoulders 32 and 76, the base 46 of the upper outer fitting 44, and the upper panel 54A of the central wingbox 52.

The step iii) furthermore includes fastening the skin 70 to the extension 14B of the junction rib 37 using fourth through-mounted fastening components 80 (FIGS. 15 and 16).

FIGS. 15 and 16 thus show a portion of the fuselage section 81 obtained on completion of the step I).

Figure 17:
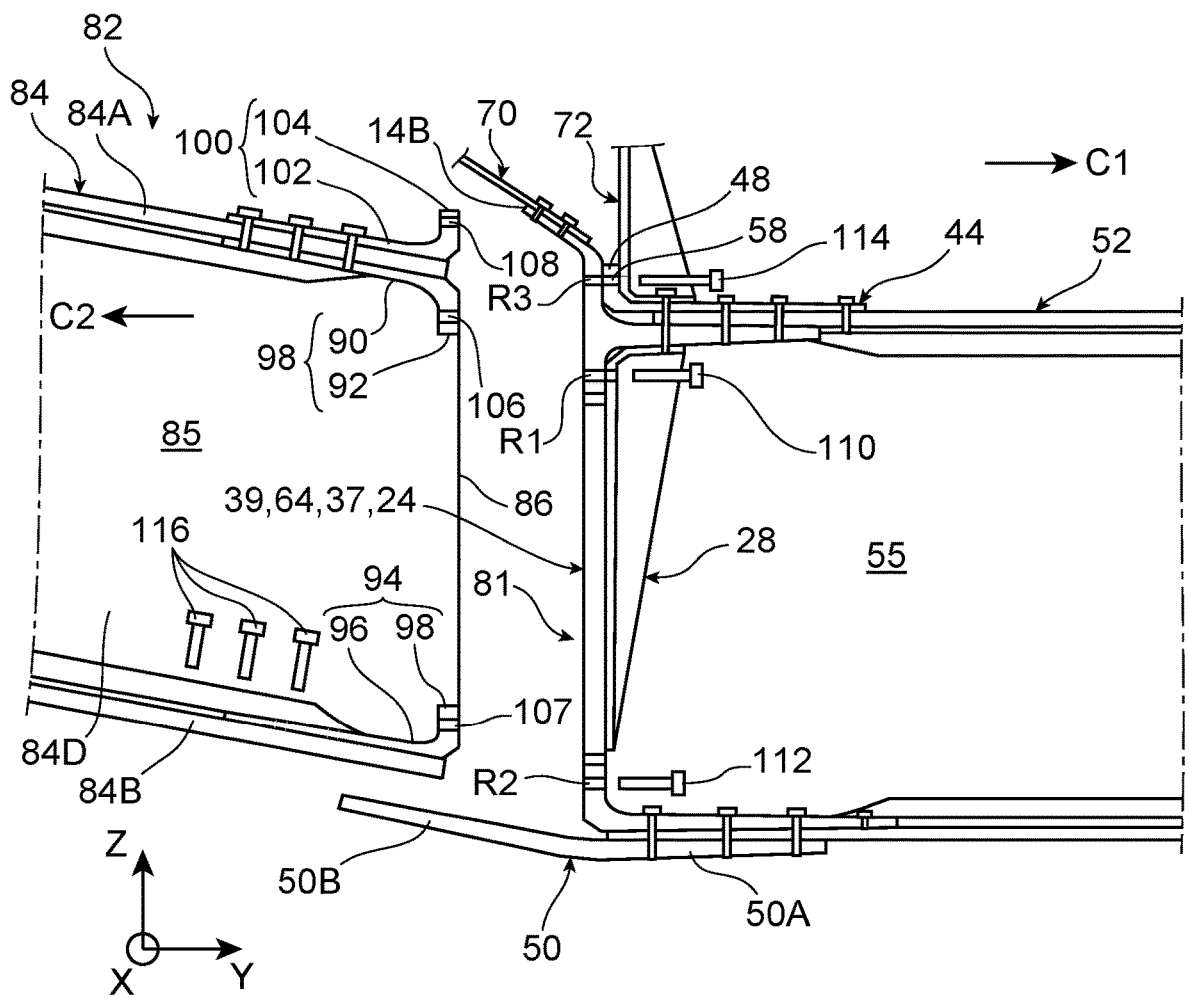
FIG. 17 is a partial schematic view in cross section of the fuselage section and a wing.

With reference to FIGS. 17 and 20, the method for producing an aircraft then includes a step II) comprising providing at least one wing 82 including a lateral wingbox 84 delimiting an inner space 85, and a step III) comprising positioning an end 86 of the lateral wingbox 84 to face the junction surface 24 of the junction rib 37, such that the distal portion 50B of the strap 50 is positioned outside the inner space 85 of the lateral wingbox 84.

The lateral wingbox 84 includes an upper panel 84A and a lower panel 84B, as well as a front member (not visible) and a rear member 84D each linking the upper panel 84A to the lower panel 84B in a well-known manner.

Moreover, the lateral wingbox 84 includes a fourth angle fitting 88 comprising a respective base 90 and a shoulder 92, a fifth angle fitting 94 comprising a respective base 96 and a shoulder 98, and a sixth angle fitting 100 comprising a respective base 102 and a shoulder 104.

The base 90 of the fourth angle fitting 88 is fastened to the upper panel 84A, inside the inner space 85 of the lateral wingbox, whereas the base 102 of the sixth angle fitting 100 is fastened to the upper panel 84A outside the inner space 85 of the lateral wingbox. In the illustrated example, the bases 90 and 102 are fastened to the upper panel 84A in a combined manner, that is to say using joint fastening components.

Moreover, the base 96 of the fifth angle fitting 94 is fastened to the lower panel 84B inside the inner space 85 of the lateral wingbox.

The respective shoulders 92, 98 and 104 of the fittings 88, 94 and 100 include respective orifices 106, 107 and 108 respectively arranged so as to be able to be aligned with the orifices 34 of the rows R1, R2 and R3, as will emerge more clearly in what follows.

On completion of the step III), the end 86 of the lateral wingbox is substantially in contact with the junction surface 24.

Figure 18:
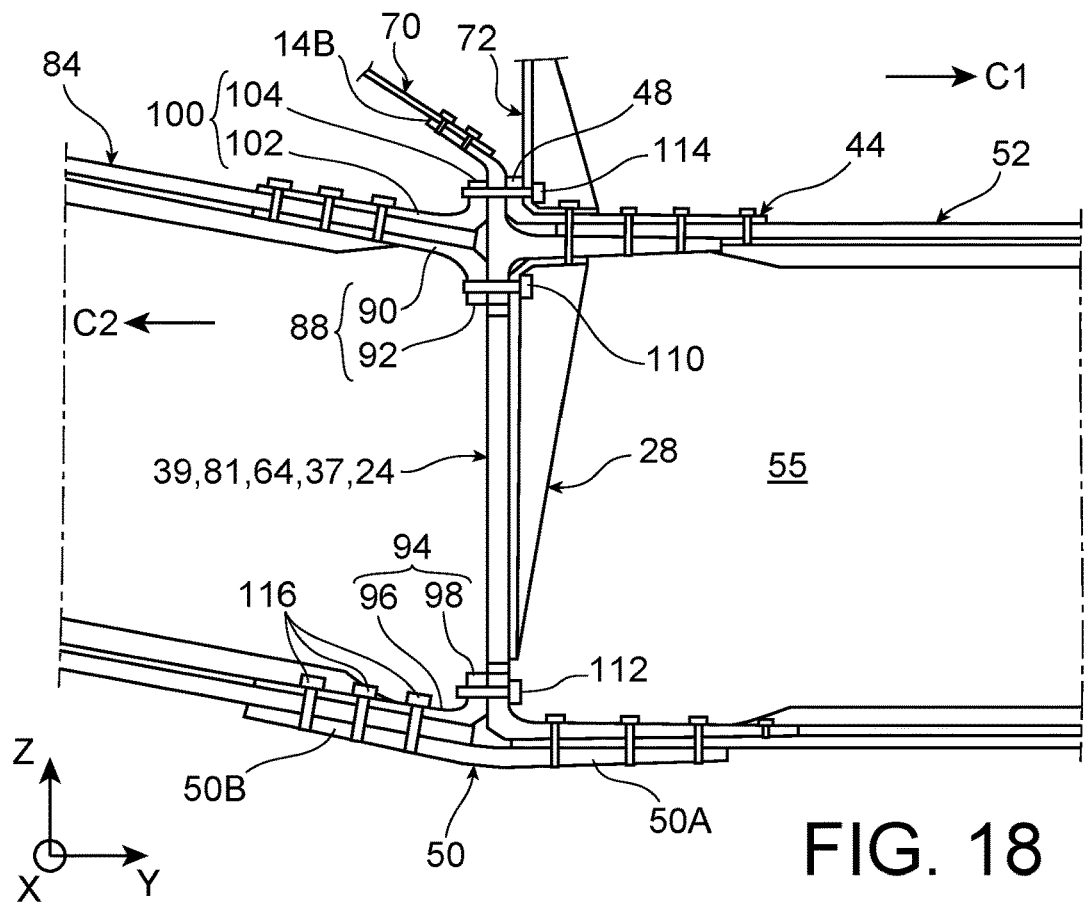
FIG. 18 is a view similar to FIG. 17, illustrating the wing assembled on the fuselage section.

With reference to FIGS. 18 and 20, the method for producing the aircraft then includes a step IV) comprising fastening the lateral wingbox 84 to the junction rib 37 using fastening components 110, 112, 114 working in tension/compression engaged respectively in the orifices 34 formed in the main web 39, and also comprising fastening the lateral wingbox 84 to the distal portion 50B of the strap 50 using fifth through-mounted fastening components 116. The fastening components 110, 112, 114 working in tension/compression and the fifth through-mounted fastening components 116 are also visible, in the non-assembled state, on FIG. 17.

In the preferred embodiment of the invention, the fastening components working in tension/compression comprise sixth through-mounted fastening components 110 mounted through the orifices 106 (FIG. 17) formed in the shoulder 92 of the fourth angle fitting 88 and through the orifices 34 of the first row of orifices R1.

Moreover, the fastening components working in tension/compression comprise seventh through-mounted fastening components 112 mounted through the orifices 107 (FIG. 17) made in the shoulder 98 of the fifth angle fitting 94 and through the orifices 34 of the second row of orifices R2.

Finally, the fastening components working in tension/compression comprise eighth through-mounted fastening components 114 mounted through the orifices 108 made in the shoulder 104 of the sixth angle fitting 100, through the orifices 34 of the third row of orifices R3, and through the orifices 58 of the shoulder 48 of the upper outer fitting 44.

The fastening components 110, 112, 114 working in tension/compression are preferably bolts. The fastening components 60, 62, 78, 80 and 116 are preferably also bolts. The person skilled in the art will understand that because of their arrangement, the fastening components 60, 62, 80 and 116 work mainly in shear.

Bringing the wing 82 into contact with the junction surface 24 is made possible by the fact that, in any cross section plane of the central wing module 81, the extension 14B of the junction rib 37 has a lower front face (that is to say arranged towards the wing 82) that forms, with a horizontal plane XY parallel to the directions X and Y, an angle α greater than the angle θ formed by the upper front face of the distal portion 50B of the strap 50 relative to the plane XY (FIG. 15). In other words, the plane P1 of the lower front face of the extension 14B and the plane P2 of the upper front face of the distal portion 50B have an intersection situated on the first side C1 relative to the junction surface 24.

Figure 19:
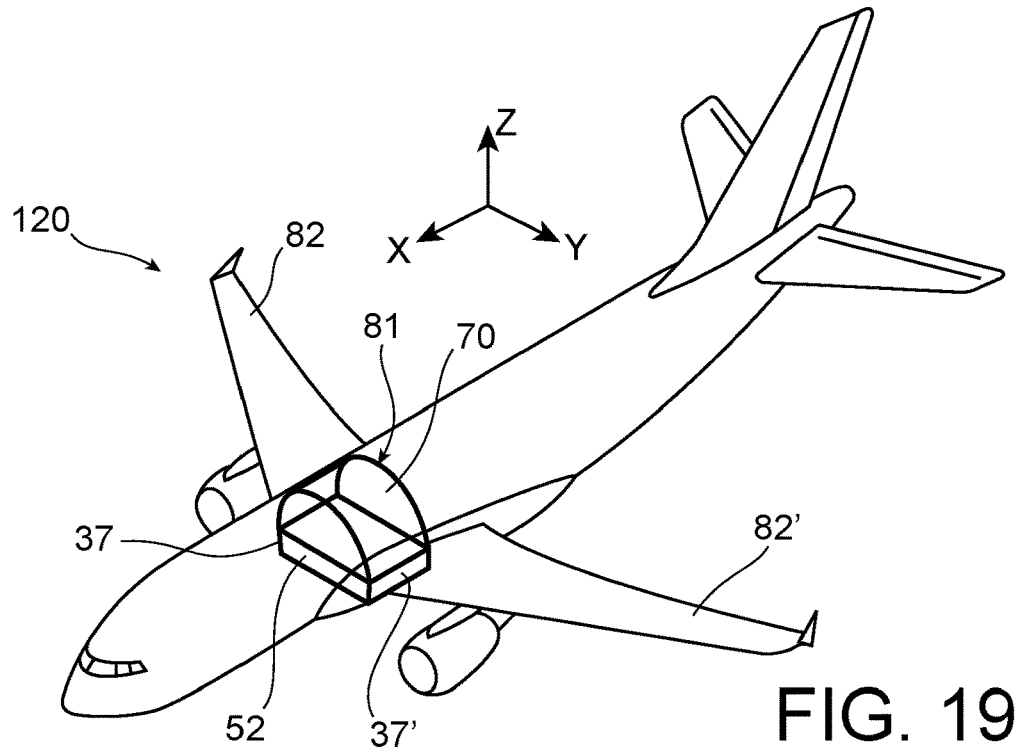
FIG. 19 is a schematic view in perspective of an aircraft comprising the wing and the fuselage section of FIG. 18.

FIG. 19 very schematically illustrates an example aircraft 120 obtained on completion of the method according to the invention.

Although the method, in its most general definition, relates to only one side of the aircraft (that is to say a wing 82, a junction rib 37 and a corresponding lateral end 56 of the central wingbox 52), of course, the method is intended to be implemented in a similar manner with respect to the opposite side of the aircraft so as to fasten a second wing 82' to the fuselage section 81 by means of a second junction rib 37' arranged at the other lateral end of the central wingbox.

The invention has numerous advantages.

First, the junction rib 37 can be produced at an upstream stage of assembly of the aircraft, in parallel with production operations of the central wingbox 52.

The configuration of the junction rib 37 effectively allows it to be assembled to the central wingbox 52 after the latter has been assembled.

If applicable, the assembly of the different profile elements 12 to the core 10 by FSW makes it possible to save time and weight and proves to be simpler to implement than assembly by bolting or riveting.

The method furthermore makes it possible to integrate a maximum number of elements into the central wing module, and hence at an upstream stage of assembly of the aircraft, including the upper outer fitting 44, the inner frame supports 28 and the strap 50.

Pre-drilling the orifices 34 also makes it possible to avoid having to perform these operations at a final assembly stage of the aircraft.

The use of fastening components 110, 112, 114 working in tension/compression, combined with the general configuration of the junction rib 37 makes it possible to reduce to best effect the number and complexity of operations at the final assembly stage of the aircraft.

It should be noted that the upper outer fitting 44 can, as a variant, be replaced by a plurality of fittings configured to be juxtaposed along the base 14 of the upper profile 12A, with or without spacing between these fittings. The same applies with respect to the angle fittings 88, 94, 100 of the lateral wingbox 84.

In any case, the third row of orifices R3 allows the main web 39 directly to absorb the tension/compression forces applied to the junction rib 37 by the lateral wingbox 84.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A central wingbox junction of an aircraft having a junction rib, comprising:
    a main web,
    an upper flange and a lower flange that extend from the main web on a first side relative to the main web,
    the main web having a junction surface arranged on a second side opposite the first side,
    the main web including rows of orifices opening on the second side in the junction surface and on the first side,
    the rows of orifices comprising at least a first row of orifices formed in an upper portion of the main web and extending from a front side towards a rear side of the junction rib,
    a second row of orifices formed in a lower portion of the main web and extending from the front side towards the rear side of the junction rib, and
    a third row of orifices formed in the upper portion of the main web and extending from the front side towards the rear side of the junction rib such that the first and third rows of orifices are arranged respectively on either side of the upper flange, each one of the rows of orifices comprising orifices configured to couple the junction rib to other aircraft components.

2. The junction rib as claimed in claim 1, including an extension inclined relative to the junction surface and which extends on the second side, from an upper end of the upper portion of the main web, so as to form an obtuse angle with the upper flange in cross section.

3. The junction rib as claimed in claim 1, furthermore including a front flange and a rear flange that extend from the main web, on the first side relative to the main web, and wherein the rows of orifices furthermore comprise a fourth row of orifices formed in a front portion of the main web and extending from a lower side towards an upper side of the junction rib, and a fifth row of orifices formed in a rear portion of the main web and extending from the lower side to the upper side of the junction rib.

4. A method for producing the central wingbox junction of the aircraft as claimed in claim 1, comprising at least steps of:
  a) providing a core, and profile elements each comprising a respective base and a respective flange extending to protrude from the base; then
  b) fastening the respective bases of the profile elements to the core, such that the respective flanges of the profile elements extend on a first side relative to the core, corresponding to the first side, the respective bases of the profile elements and the core together forming the main web; and
  wherein, on completion of the method, the main web includes the rows of orifices comprising at least the first row of orifices, formed in the base of a first one of the profile elements, called an upper profile, and the second row of orifices, formed in the base of a second one of the profile elements, called a lower profile, the upper and lower profiles being arranged at two opposite ends of the core, called an upper end and a lower end, such that the base of the upper profile forms the upper portion of the main web, and such that the flange of the upper profile forms the upper flange, and such that the base of the lower profile forms the lower portion of the main web, and such that the flange of the lower profile forms the lower flange, wherein the base of the upper profile extends on either side of the flange of the upper profile and comprises the third row of orifices, and wherein each row of orifices comprises orifices configured to couple the junction rib to other aircraft components.

5. The method as claimed in claim 4, wherein each of the profile elements other than the upper profile has an angled configuration.

6. The method as claimed in claim 4, furthermore comprising steps of:
  c) providing first angle fittings, called inner frame supports, each comprising a respective base and a shoulder; then
  d) after the step b), fastening the respective bases of the inner frame supports to the main web.

7. The method as claimed in claim 4 for producing a junction rib furthermore including a front flange and a rear flange that extend from the main web, on the first side relative to the main web, and wherein the rows of orifices furthermore comprise a fourth row of orifices formed in a front portion of the main web and extending from a lower side towards an upper side of the junction rib, and a fifth row of orifices formed in a rear portion of the main web and extending from the lower side to the upper side of the junction rib, wherein the fourth row of orifices is formed in a third one of the profile elements, called a front profile, and the fifth row of orifices is formed in a fourth one of the profile elements, called a rear profile, the front and rear profiles being arranged at two opposite ends of the core, respectively called a front end and a rear end, each of which links the upper end to the lower end of the core, such that the base of the front profile forms a front portion of the main web and such that a flange of the front profile forms the front flange, and such that a base of the rear profile forms a rear portion of the main web and such that a flange of the rear profile forms said rear flange.

8. A method for producing a central wing module for aircraft, comprising at least steps of:
  A) producing at least one central wingbox junction of an aircraft claimed in claim 1;
  B) providing at least one second angle fitting, called an upper outer fitting, comprising a base and a shoulder;
  C) providing at least one strap;
  D) providing the central wingbox, which includes at least an upper panel, a lower panel, a front member linking a front end of the upper panel to a front end of the lower panel, and a rear member linking a rear end of the upper panel to a rear end of the lower panel, such that the upper and lower panels and the front and rear members delimit an inner space of the central wingbox open at at least one lateral end of the central wingbox, then
  E) disposing the junction rib at said lateral end of the central wingbox by inserting the flanges into the inner space of the central wingbox, such that the upper flange is facing the upper panel and the lower flange is facing the lower panel; then
  F) fastening together the upper flange and the base of said at least one upper outer fitting to the upper panel using first through-mounted fastening components, and fastening together the lower flange and a proximal portion of said at least one strap to the lower panel using second through-mounted fastening components, such that a distal portion of said at least one strap extends beyond the junction surface in a distancing direction relative to the central wingbox.

9. The method as claimed in claim 8, wherein the junction rib furthermore including a front flange and a rear flange that extend from the main web, on the first side relative to the main web, and wherein the rows of orifices furthermore comprise a fourth row of orifices formed in a front portion of the main web and extending from a lower side towards an upper side of the junction rib, and a fifth row of orifices formed in a rear portion of the main web and extending from the lower side to the upper side of the junction rib, and wherein the step F) furthermore includes fastening the front flange and rear flange respectively to the front member and the rear member.

10. The method as claimed in claim 8, wherein the step A) comprises producing a junction rib furthermore including a front flange and a rear flange that extend from the main web, on the first side relative to the main web, and wherein the rows of orifices furthermore comprise a fourth row of orifices formed in a front portion of the main web and extending from a lower side towards an upper side of the junction rib, and a fifth row of orifices formed in a rear portion of the main web and extending from the lower side to the upper side of the junction rib, wherein the fourth row of orifices is formed in a third one of the profile elements, called a front profile, and the fifth row of orifices is formed in a fourth one of the profile elements, called a rear profile, the front and rear profiles being arranged at two opposite ends of the core, respectively called a front end and a rear end, each of which links the upper end to the lower end of the core, such that the base of the front profile forms a front portion of the main web and such that a flange of the front profile forms the front flange, and such that a base of the rear profile forms a rear portion of the main web and such that a flange of the rear profile forms said rear flange, and wherein the step F) furthermore includes fastening the front flange and rear flange respectively to the front member and the rear member.

11. The method as claimed in claim 8, wherein the distal portion of said at least one strap forms, in cross section, an angle relative to the proximal portion of said at least one strap.

12. The method as claimed in claim 8, wherein the junction rib includes an extension inclined relative to the junction surface and which extends on the second side, from an upper end of the upper portion of the main web, so as to form an obtuse angle with the upper flange in cross section, and wherein the shoulder of said at least one upper outer fitting includes orifices aligned respectively with the orifices of the third row of orifices.

13. The method as claimed in claim 8, wherein the junction rib furthermore comprising steps of:
   a) providing a core, and profile elements each comprising a respective base and a respective flange extending to protrude from the base; then
   b) fastening the respective bases of the profile elements to the core, such that the respective flanges of the profile elements extend on a first side relative to the core, corresponding to the first side, the respective bases of the profile elements and the core together forming the main web; and
   c) providing first angle fittings, called inner frame supports, each comprising a respective base and a shoulder; then
   d) after the step b), fastening the respective bases of the inner frame supports to the main web,
   wherein, on completion of the method, the main web includes the rows of orifices comprising at least the first row of orifices, formed in the base of a first one of the profile elements, called an upper profile, and the second row of orifices, formed in the base of a second one of the profile elements, called a lower profile, the upper and lower profiles being arranged at two opposite ends of the core, called an upper end and a lower end, such that the base of the upper profile forms the upper portion of the main web, and such that the flange of the upper profile forms the upper flange, and such that the base of the lower profile forms the lower portion of the main web, and such that the flange of the lower profile forms the lower flange, wherein the base of the upper profile extends on either side of the flange of the upper profile and comprises the third row of orifices, and wherein each row of orifices comprises orifices in a free state, and
   wherein the shoulder of said at least one upper outer fitting includes orifices aligned respectively with the orifices of the third row of orifices.

14. A method for producing a fuselage section for aircraft, comprising at least steps of:
   i) producing a central wing module for aircraft according to the method of claim 8;
   ii) providing a fuselage structure;
   iii) fastening said at least one upper outer fitting to the fuselage structure.

15. The method as claimed in claim 14, wherein the step A) of the step i) further comprises the steps of
   a) providing a core, and profile elements each comprising a respective base and a respective flange extending to protrude from the base; then
   b) fastening the respective bases of the profile elements to the core, such that the respective flanges of the profile elements extend on a first side relative to the core, corresponding to the first side, the respective bases of the profile elements and the core together forming the main web; and
   c) providing first angle fittings, called inner frame supports, each comprising a respective base and a shoulder; then
   d) after the step b), fastening the respective bases of the inner frame supports to the main web,
   wherein, on completion of the method, the main web includes the rows of orifices comprising at least the first row of orifices, formed in the base of a first one of the profile elements, called an upper profile, and the second row of orifices, formed in the base of a second one of the profile elements, called a lower profile, the upper and lower profiles being arranged at two opposite ends of the core, called an upper end and a lower end, such that the base of the upper profile forms the upper portion of the main web, and such that the flange of the upper profile forms the upper flange, and such that the base of the lower profile forms the lower portion of the main web, and such that the flange of the lower profile forms the lower flange, wherein the base of the upper profile extends on either side of the flange of the upper profile and comprises the third row of orifices, and wherein each row of orifices comprises orifices in a free state, and
   wherein the shoulder of said at least one upper outer fitting includes orifices aligned respectively with the orifices of the third row of orifices,
   wherein the fuselage structure includes circumferential frames provided with third respective angle fittings, called outer frame supports, each comprising a respective base and a shoulder; and
   wherein the step iii) includes fastening the respective shoulders of the outer frame supports respectively to the respective shoulders of the inner frame supports using third through-mounted fastening components.

16. The method as claimed in claim 14, wherein:
   the junction rib includes an extension inclined relative to the junction surface and which extends on the second side, from an upper end of the upper portion of the main web, so as to form an obtuse angle with the upper flange in cross section;
   the fuselage structure includes a skin; and
   the step iii) includes fastening the skin to the extension using fourth through-mounted fastening components.

17. A method for producing an aircraft, comprising at least steps of:
   producing a fuselage section according to the method of claim 14;
   providing at least one wing including a lateral wingbox delimiting an inner space; then
   positioning an end of the lateral wingbox to face the junction surface, such that the distal portion of said at least one strap is positioned outside the inner space of the lateral wingbox; then fastening the lateral wingbox to the junction rib using fastening components working in tension/compression engaged respectively in the orifices of said rows of orifices, and fastening the lateral wingbox to the distal portion of said at least one strap using fifth through-mounted fastening components.

18. The method as claimed in claim 17, wherein:
the lateral wingbox includes an upper panel and a lower panel, as well as at least one fourth angle fitting and at least one fifth angle fitting;
said at least one fourth and fifth angle fittings each comprise a respective base and a respective shoulder;
the base of said at least one fourth angle fitting is fastened to the upper panel of the lateral wingbox, inside the inner space of the lateral wingbox;
the base of said at least one fifth angle fitting is fastened to the lower panel of the lateral wingbox, inside the inner space of the lateral wingbox;
said fastening components working in tension/compression comprise sixth through-mounted fastening components mounted through orifices formed in the shoulder of said at least one fourth angle fitting and orifices of the first row of orifices; and
said fastening components working in tension/compression comprise seventh through-mounted fastening components mounted through orifices formed in the shoulder of said at least one fifth angle fitting and orifices of the second row of orifices.

19. The method as claimed in claim 17, wherein:
the step i) of the step of producing a fuselage section comprises producing the central wing module with the further steps of:
a) providing a core, and profile elements each comprising a respective base and a respective flange extending to protrude from the base; then
b) fastening the respective bases of the profile elements to the core, such that the respective flanges of the profile elements extend on a first side relative to the core, corresponding to the first side, the respective bases of the profile elements and the core together forming the main web; and
c) providing first angle fittings, called inner frame supports, each comprising a respective base and a shoulder; then
d) after the step b), fastening the respective bases of the inner frame supports to the main web,
wherein, on completion of the method, the main web includes the rows of orifices comprising at least the first row of orifices, formed in the base of a first one of the profile elements, called an upper profile, and the second row of orifices, formed in the base of a second one of the profile elements, called a lower profile, the upper and lower profiles being arranged at two opposite ends of the core, called an upper end and a lower end, such that the base of the upper profile forms the upper portion of the main web, and such that the flange of the upper profile forms the upper flange, and such that the base of the lower profile forms the lower portion of the main web, and such that the flange of the lower profile forms the lower flange, wherein the base of the upper profile extends on either side of the flange of the upper profile and comprises the third row of orifices, and wherein each row of orifices comprises orifices configured to couple the junction rib to other aircraft components, and
wherein the shoulder of said at least one upper outer fitting includes orifices aligned respectively with the orifices of the third row of orifices;
the lateral wingbox includes at least one sixth angle fitting comprising a base and a shoulder;
the base of said at least one sixth angle fitting is fastened to the upper panel outside the inner space of the lateral wingbox; and
said fastening components working in tension/compression comprise eighth through-mounted fastening components mounted through orifices formed in the shoulder of said at least one sixth angle fitting, orifices of the third row of orifices and orifices of the shoulder of said at least one upper outer angle fitting.

* * * * *